(12) United States Patent
Elkins et al.

(10) Patent No.: US 11,987,354 B2
(45) Date of Patent: May 21, 2024

(54) HYPERSONIC AIR-FLOW DEFLECTOR, AND ATTACHMENT METHOD

(71) Applicant: Raytheon Company, Tewksbury, MA (US)

(72) Inventors: Keith A. Elkins, Tucson, AZ (US); Gary Lee Lidstone, Tucson, AZ (US); Frank P. Johansen, Tucson, AZ (US); Paul T. Hudak, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 0 days.

(21) Appl. No.: 17/739,633

(22) Filed: May 9, 2022

(65) Prior Publication Data

US 2023/0356838 A1 Nov. 9, 2023

(51) Int. Cl.
*B64C 30/00* (2006.01)
*B64C 31/02* (2006.01)
*B64D 1/02* (2006.01)

(52) U.S. Cl.
CPC .............. *B64C 30/00* (2013.01); *B64C 31/02* (2013.01); *B64D 1/02* (2013.01)

(58) Field of Classification Search
CPC ........... B64C 30/00; B64C 31/02; B64D 1/02; B64G 1/006; B64G 1/002; B64G 1/645; B64G 1/6457
See application file for complete search history.

(56) References Cited

U.S. PATENT DOCUMENTS

| | | | |
|---|---|---|---|
| 2,959,129 A | 11/1960 | Warren | |
| 3,345,946 A | 10/1967 | Johnson et al. | |
| 3,903,803 A * | 9/1975 | Losey | F42B 15/36 102/378 |
| 4,120,519 A | 10/1978 | Bridges | |
| 4,723,736 A | 2/1988 | Rider | |
| 5,046,426 A | 9/1991 | Julien et al. | |
| 5,927,653 A | 7/1999 | Mueller et al. | |
| 6,439,122 B1 | 8/2002 | Nygren et al. | |
| 6,557,475 B1 | 5/2003 | Nygren et al. | |
| 10,214,303 B1 | 2/2019 | Turner et al. | |

(Continued)

FOREIGN PATENT DOCUMENTS

| | | |
|---|---|---|
| CN | 111071489 | 4/2020 |
| EP | 3225558 A1 | 10/2017 |

OTHER PUBLICATIONS

International Search Report and Written Opinion for related International Application No. dated Jun. 20, 2023.

*Primary Examiner* — Rodney A Bonnette
(74) *Attorney, Agent, or Firm* — Schwegman Lundberg & Woessner, P.A.

(57) ABSTRACT

A flow deflector for an aerial vehicle system has a flow deflector body, a clip arranged in an interior of the flow deflector body, and a spring within the clip. The flow deflector body includes a first portion at a forward end shaped to engage a surface of an aerial vehicle body and a second portion at an aft end shaped to engage a surface of a booster engine. The flow deflector body can include a plurality of body segments arranged to form the flow deflector body. The clip may be configured to fit around and engage a portion of an aft flange of the aerial vehicle body. The spring can be preloaded and arranged to press on the aft flange when the clip engages the portion of the aft flange.

20 Claims, 6 Drawing Sheets

(56) References Cited

U.S. PATENT DOCUMENTS

| | | |
|---|---|---|
| 10,222,189 B2 | 3/2019 | Reimann et al. |
| 2012/0305172 A1* | 12/2012 | Maheshwari ............ C08J 5/243 |
| | | 156/182 |
| 2017/0225808 A1* | 8/2017 | Echelman ............. F16B 7/0406 |

* cited by examiner

HYPERSONIC AIR-FLOW DEFLECTOR, AND ATTACHMENT METHOD

FIELD OF DISCLOSURE

The disclosure relates to flow deflectors for high-speed aerial vehicles.

DESCRIPTION OF RELATED ART

Various applications require projectiles or payloads that are launched from a mission suitable platform, such as a land, sea, air, or space vehicle, or stationary platform. The payload to be launched is dependent on the application. Military applications may use deployable munitions or projectiles which are launched by a gun or cannon. Commercial applications may use deployable projectiles, such as Cube-Sats, which are launched from a designated launching pad. The projectile may be attached to a booster engine that provides either additional propulsion after the projectile is fired from the gun and/or initial propulsion from a launching pad.

To reduce unnecessary mass during travel, one or more parts may be discarded during a flight of the projectile. For instance, the booster engine may be discarded when a desired speed is reached, and the projectile continues the flight without the additional propulsion. In another example, the booster engine may be discarded once the booster engine runs out of fuel.

During high-speed flight, airframe outer mold line geometry changes can result in shock formation resulting in increased drag. Vehicle drag is a function of velocity and shock formation in the air flowing along the projectile system, and thus hypersonic flights are more susceptible to increased drag from disruptions in the airflow caused by abrupt geometry changes, sharp edges, and/or the like. Conventionally the projectile is smaller and has a different geometry compared to the booster engine. Generally, a shroud that surrounds the projectile and attaches to the booster engine to provide more uniform geometry. However, the use of a shroud results in both additional weight and additional staging steps to discard the shroud to let the projectile travel independently during the hypersonic flight.

SUMMARY

A flow deflector for a vehicle system includes a flow deflector body, a clip arranged in an interior of the flow deflector body, and a spring within the clip. The flow deflector body includes a forward end that engage a surface of an aerial vehicle body and an aft end shaped to engage a surface of a booster engine. The clip may be configured to fit around and engage a portion of an aft flange of the aerial vehicle body. The spring can be preloaded and arranged to press on the aft flange when the clip engages the portion of the aft flange. In the assembled state, a portion of the flow deflector is lodged between the vehicle body and the booster engine. Once the booster engine is discarded in the kicked stage, the flow deflector slides off the vehicle body and is also discarded. The use of a detachable flow deflector removes the need for a shroud.

According to an aspect of the disclosure, a flow deflector comprises: a flow deflector body including a first portion at a forward end shaped to engage a surface of an aerial vehicle body and a second portion at an aft end shaped to engage a surface of a booster engine, wherein the flow deflector body comprises a plurality of body segments arranged to form the flow deflector body; a clip arranged in an interior of the flow deflector body, wherein the clip is configured to fit around and engage a portion of an aft flange of the aerial vehicle body; and a spring within the clip, wherein the spring is arranged to press on the aft flange when the clip engages the portion of the aft flange, wherein the spring is preloaded.

According to an embodiment of any paragraph(s) of this summary, the clip is in a plurality of clips arranged the interior of the flow deflector body, wherein each of the clips is configured to engage a different portion of the aft flange.

According to an embodiment of any paragraph(s) of this summary, a first clip of plurality of clips is a first size, wherein a second clip of the plurality of clips is a second size different from the first size.

According to an embodiment of any paragraph(s) of this summary, the spring is in a plurality of springs, wherein each spring of the plurality of springs corresponds to a clip of the plurality of clips.

According to an embodiment of any paragraph(s) of this summary, a first spring of the plurality of springs has a first preload and a second spring of the plurality of springs has a second preload, wherein the first preload is different from the second preload.

According to an embodiment of any paragraph(s) of this summary, the flow deflector body comprises two body segment.

According to an embodiment of any paragraph(s) of this summary, wherein a shape of each of the two body segments is similar.

According to an embodiment of any paragraph(s) of this summary, the flow deflector body is a hollow conical shape with an exterior surface and an interior surface, wherein the clip is arranged on the interior surface, wherein a portion of the interior surface at the forward end engages the surface of the vehicle body and a second portion of the interior surface at the aft end engages the booster engine.

According to an embodiment of any paragraph(s) of this summary, the interior surface of the flow deflector body is shaped to surround a portion of a connection between the vehicle body and the booster engine.

According to an embodiment of any paragraph(s) of this summary, a cross-section of the forward end of the flow deflector body is different from a cross-section of the aft end of the flow deflector body.

According to an embodiment of any paragraph(s) of this summary, a cross-sectional area of the forward end of the flow deflector body is smaller than a cross-sectional area of the aft end of the flow deflector body.

According to an embodiment of any paragraph(s) of this summary, a part of the first portion that engages the surface of the vehicle body is flexible graphite.

According to an embodiment of any paragraph(s) of this summary, wherein the flow deflector is included in a vehicle system, wherein the vehicle system further includes the aerial vehicle body and the booster engine attachable to an aft end of the aerial vehicle body.

According to another aspect of the disclosure, a method of detaching a flow deflector from a hypersonic vehicle includes: separating a booster engine from an aft end of the hypersonic vehicle, wherein a portion of the flow deflector is lodged between the aft end of the hypersonic vehicle and the booster engine holding the flow deflector in place while the booster engine is connected to the aft end of the hypersonic vehicle, wherein a clip of the flow deflector is configured to fit around and engage a portion of the aft end; sliding the clip of the flow deflector along a surface of the aft end of the hypersonic vehicle due to fluid flowing along the hypersonic vehicle pressing on a surface of the flow deflector; and detaching a portion of the flow deflector from the hypersonic vehicle when the clip slides off the surface at the aft end.

According to an embodiment of any paragraph(s) of this summary, connection of the booster engine to the aft end holds a spring in the flow deflector in a preloaded position, wherein sliding the clip of the flow deflector along the surface is further due to unloading the preload of the spring by pressing the flow deflector away from the hypersonic vehicle According to an embodiment of any paragraph(s) of this summary, the preload is provided by compressing the spring According to an embodiment of any paragraph(s) of this summary, a second clip of the flow deflector is configured to fit around and engage a second portion of the aft end, the method further comprising: sliding the second clip of the flow deflector along the surface of the aft end of the hypersonic vehicle due to fluid flowing along the hypersonic vehicle pressing on a surface of the flow deflector; and detaching a second portion of the flow deflector from the hypersonic vehicle when the second clip slides off the surface at the aft end.

According to an embodiment of any paragraph(s) of this summary, the flow deflector comprises a plurality of segments, wherein the portion is a first segment of the plurality of segments and the second portion is a second segment of the plurality of segments.

According to yet another aspect of the disclosure, a vehicle system comprises: a hypersonic vehicle; a booster engine attachable to an aft end of the hypersonic vehicle; and a flow deflector removably retained between the hypersonic aerial vehicle and the booster engine, wherein the flow deflector includes: a flow deflector body including a first portion at a forward end shaped to engage a surface of the hypersonic vehicle and a second portion at an aft end shaped to engage a surface of the booster engine; a clip arranged in an interior of the flow deflector body, wherein the clip is configured to fit around and engage a portion of an aft flange of the aerial vehicle body, wherein the first portion engages the surface of the hypersonic vehicle and the second portion engages the booster engine to hold the flow deflector in place when the clip engages the portion of the aft flange and the booster engine is attached to the aft end of the hypersonic vehicle; and a spring within the clip, wherein the spring is arranged to press on the aft flange when the clip engages the portion of the aft flange, wherein the spring is preloaded.

According to an embodiment of any paragraph(s) of this summary, the flow deflector body comprises a plurality of body segments arranged to form the flow deflector body.

To the accomplishment of the foregoing and related ends, the disclosure comprises the features hereinafter fully described and particularly pointed out in the claims. The following description and the annexed drawings set forth in detail certain illustrative embodiments of the disclosure. These embodiments are indicative, however, of but a few of the various ways in which the principles of the disclosure may be employed. Other objects, advantages and novel features of the disclosure will become apparent from the following detailed description when considered in conjunction with the drawings.

BRIEF DESCRIPTION OF DRAWINGS

The annexed drawings, which are not necessarily to scale, show various aspects of the disclosure.

DETAILED DESCRIPTION

Figure 1:
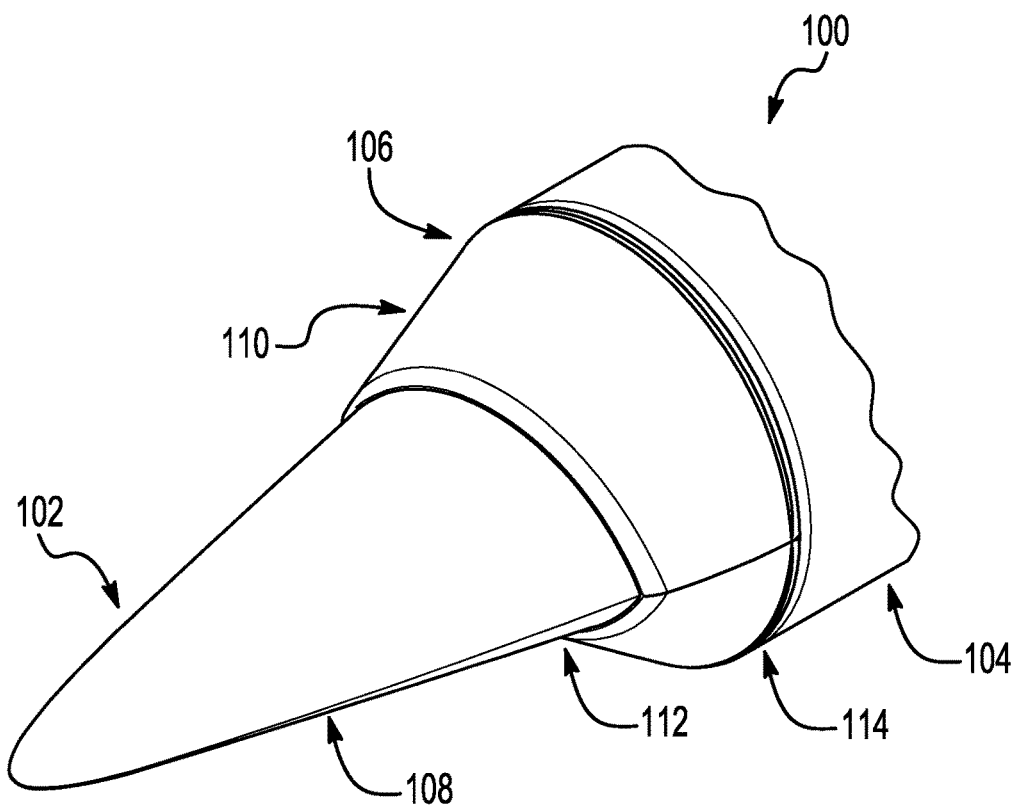
FIG. 1 is a view of a vehicle assembly that includes a flow deflector, according to an embodiment of the disclosure.

Aspects of the present application pertain to a flow deflector for an aerial vehicle are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Disclosed is a flow deflector for a hypersonic vehicle system that detaches from the hypersonic vehicle without requiring a staging step. The flow deflector includes a flow deflector body and a clip arranged in an interior of the flow deflector body. The clip may be configured to fit around and engage a portion of an aft flange of the aerial vehicle body. In the assembled state, a portion of the flow deflector is lodged between the vehicle body and the booster engine. Once the booster engine is discarded in the kicked stage, the flow deflector slides off the vehicle body and is also discarded. The use of a detachable flow deflector removes the need for a shroud.

Turning now to FIG. 1, illustrated is a vehicle system 100 that includes a vehicle body 102, a booster engine 104, and a flow deflector 106 configured to direct external flow of fluid between the vehicle body 102 and the booster engine 104. The fluid can include gas, liquid, and/or the like. In the following embodiments, the fluid includes air.

The vehicle body 102 can take any suitable shape, size, and/or configuration for the desired travel. In the illustrated embodiment, the travel body includes a glider 108 configured for non-powered hypersonic air travel. Because the glider 108 is not powered, the glider 108 relies on the booster engine 104 to achieve the hypersonic speed. Once the desired hypersonic speed is reached, the booster engine 104 is discarded and the glider 108 continues the hypersonic flight, for instance, the glider 108 can be "kicked" from the booster engine 104 to continue the flight.

As noted above, during travel, air flows around the vehicle system 100 and interruptions to air flow around the vehicle system 100 result in increased travel turbulence and drag. Drag is a function of velocity of the air flowing along the vehicle system 100, and thus hypersonic flights are more susceptible to increases in drag from disruptions in the airflow caused by abrupt geometry changes, sharp edges, and/or the like. As can be seen in FIG. 1, conventionally the glider 108 is smaller and different geometrically compared to the booster engine 104. Conventionally the vehicle system 100 includes a shroud that surrounds the glider 108 and attaches to the booster engine to provide more uniform geometry and potentially lower drag. However, the use of a shroud results in both additional weight and additional staging steps to discard the shroud to let the glider 108 travel independently during the hypersonic flight.

To overcome these limitations, the flow deflector 106 allows for removal of the weight and staging steps associated with use of shroud while also providing a transition surface between the geometry of the glider 108 and the geometry of the booster engine 104 to reduce drag and aeroheating. In the illustrated embodiment, the flow deflector 106 has a sloped surface 110 to direct flow of air over the vehicle system 100. To retain the flow deflector 108 during flight of the vehicle system 100, the flow deflector 108 includes a portion at a forward end 112 that engages an outer surface of the glider 108 and a portion at an opposing aft end 114 that engages an outer surface of the booster engine 104. As will be described in detail below, the flow deflector 106 further includes structure to attach the flow deflector 106 in place prior to stage separation (e.g., the booster engine 104 kicking the glider 108) without permanent attachment to the glider 108 and/or the booster engine 104. The structure can be further configured to separate the flow deflector 106 from the glider 108 by requiring the use of staged explosive devices. In contrast, the flow of air over the glider 108 and the structure of the flow deflector 106 cause the separation of the flow deflector 106 from the glider 108 post-kick out.

The flow deflector 106 can take any suitable shape, configuration, and/or size to achieve the described benefits. Because of the above-described engagements, shape may depend on a cross-section of the glider 108 and/or a cross-section of the booster engine 104. Moreover, shape of an exterior surface of the flow deflector 106 may depend on the difference in size between the glider 108 and the booster engine 104. In the illustrated embodiment, the flow deflector 106 extends around the entire body of the glider 108. In another embodiment, the flow deflector 106 extends around a portion thereof and may depend on the shape of the glider 108, the booster engine 104, and/or the like.

Figure 2:
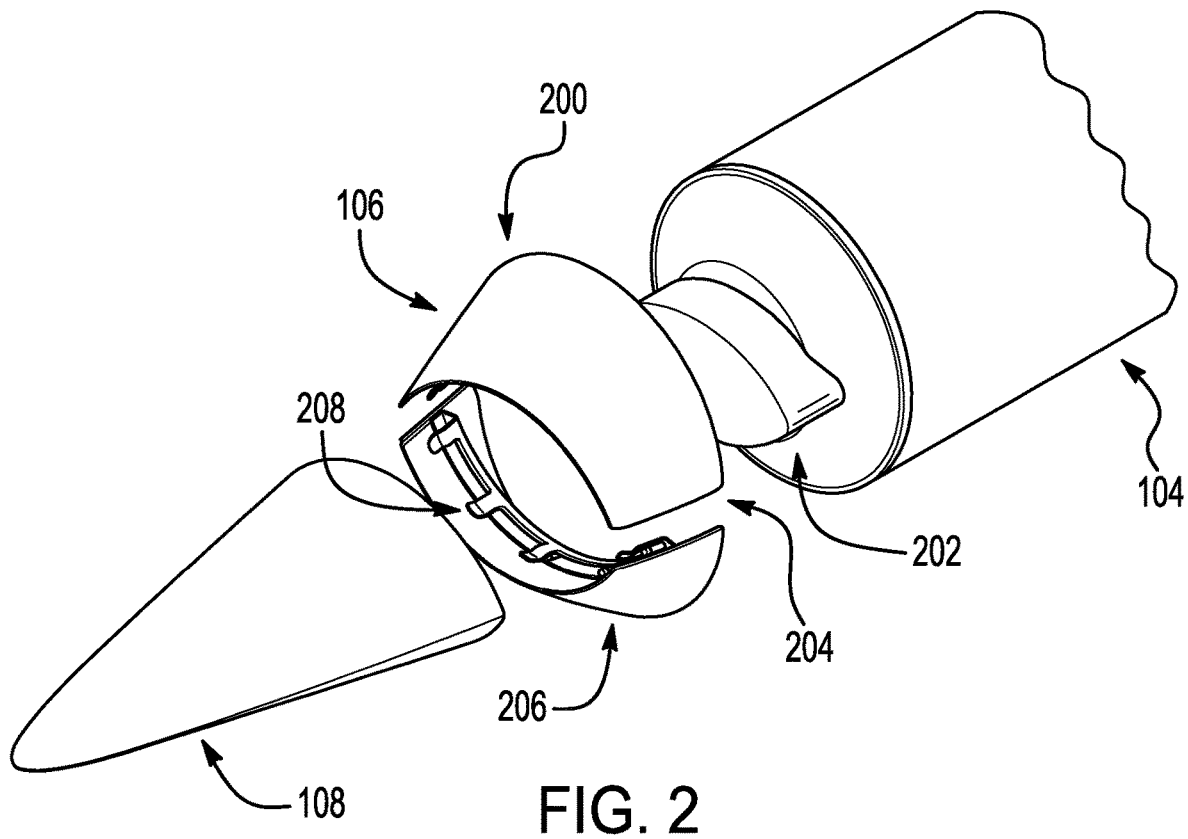
FIG. 2 is an exploded view of the vehicle assembly of FIG. 1.

Turning now to FIG. 2, illustrated is the glider 108, the booster engine 104, and the flow deflector 106 separated from each other. For instance, FIG. 2 represents the state of the vehicle system 100 post-kick out, where the glider 108 is kicked from the booster engine 104, and post-separation of the flow deflector 106 from the glider 108. The flow deflector 106 includes a flow deflector body 200 and the structure for removably securing the flow deflector 106 to the glider 108 and/or the booster engine 104. In the illustrated embodiments herein, the structure is configured for removably securing the flow deflector 106 to the glider 108.

As can be seen in FIG. 2, the booster engine 104 includes an attachment structure 202 that can be used to attach the glider 108 to the booster engine 104 prior to the kick-out stage. The flow deflector body 200 is shaped to leave the conventional attachment area between the glider 108 and booster engine 104 unobstructed, instead the flow deflector body 200 is shaped to extend around the attachment structure 202 forming a hollow conical flow deflector body 200 with the sloped surface 110.

The flow deflector body 200 may include a single piece or may be segmented into a plurality of segments. In the illustrated embodiment, the flow deflector 108 includes a first segment 204 that extends around a first portion of the glider 108 and a second segment 206 that extends around a second portion of the glider 108. The segments 204 and 206 can be similar in size and design (as illustrated) and/or may vary.

In the illustrated embodiment, the first segment 204 is separate from the second segment 206 such that separation of the first segment 204 from the glider 108 is independent of separation of the second segment 206 from the glider 108. In another embodiment, the segments 204 and 206 may include connecting structure to connect the segments together such that separation of one segment from the glider 108 and/or booster engine 104 contributes to separation of the other segment. The connecting structure may include snap and lock structure, twist and lock structure, attached hinges, and/or the like.

The structure for removably attaching the flow deflector body 200 to the glider 108 includes a clip 208 that removably clips onto the glider 108. In the illustrated embodiment, the clip 208 is an open C-shaped clip shaped to fit around and engage a portion of the glider 108. The flow deflector body 200 can include any number of clips, such as one or more clips in each segment. In the illustrated embodiment, each segment 204 and 206 includes five clips 208.

The clips 208 are arranged on an interior surface of the hollow conical flow deflector body 200. The clips 208 are arranged such that the flow deflector body 200 separates from the glider 108 after the kick-out stage and with minimal impact on the hypersonic flight of the glider 108. To this end, the clips 208 can be arranged in any suitable pattern within the flow deflector body 200. The pattern may depend on shape of the glider 108, speed of the vehicle system 100 at the kick-out stage, number of flow deflector body segments, and/or the like.

Figure 3:
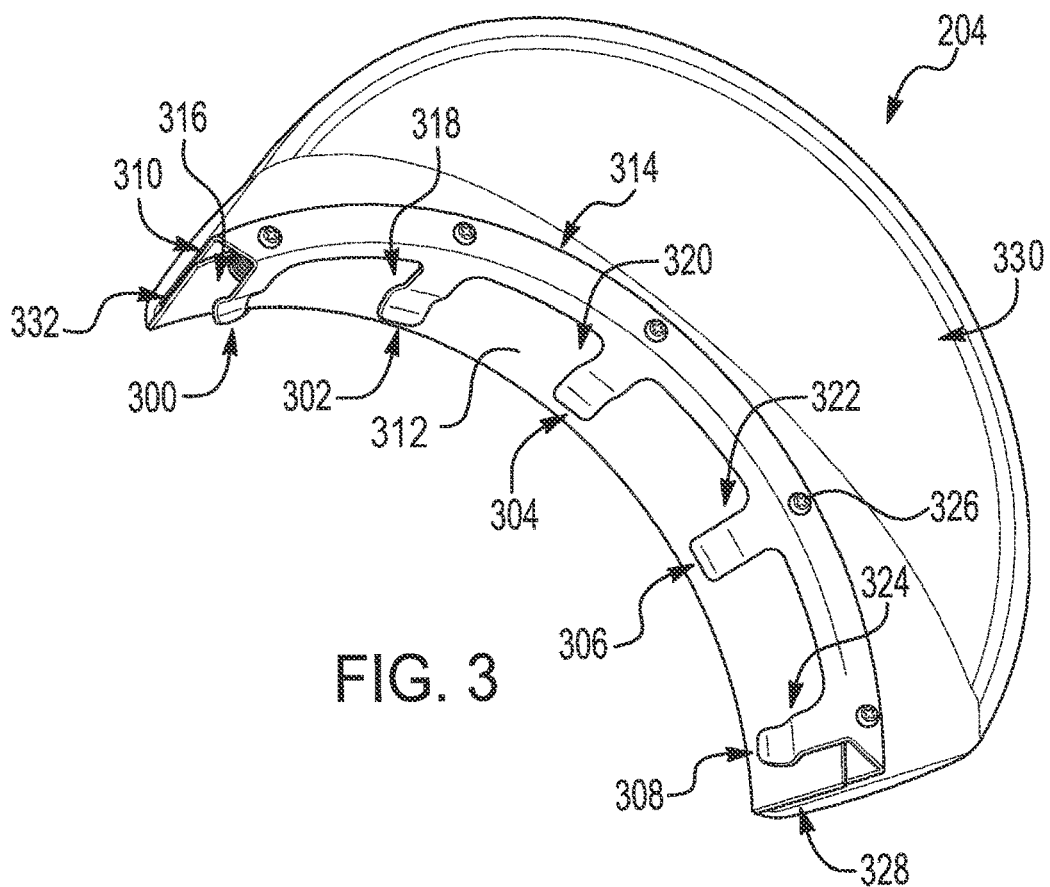
FIG. 3 is a view of a segment of a flow deflector.

Turning now to FIG. 3, discussion will now be made with respect to the first segment 204 but may be also applied to the second segment 206. The first segment 204 includes five clips: a first clip 300, a second clip 302, a third clip 304, a fourth clip 306, and a fifth clip 308 (hereafter, "clips 300-308"). The clips 300-308 are spaced symmetrically within the first segment 204. The illustrated clips 300-308 share a common first surface 310 that is attached to the interior surface 312 of the first segment 204. The illustrated clips 300-308 further share a common middle portion 314 that extends at an angle from the first surface 310. Each clip 300-308 further includes a respective flange: a first flange 316 for the first clip 300, a second flange 318 for the second clip 302, a third flange 320 for the third clip 304, a fourth flange 322 for the fourth clip 306, and a fifth flange 324 for the fifth clip 308 (hereafter, "flanges 316-324"). Each of the flanges 316-324 extend from the common middle portion 314 to removably sandwich a portion of the glider 108 between a respective flange and the first surface 310.

Each of the clips 300-308 may further include a bolt extending from the middle portion of the clip (e.g., middle portion 314) into an interior of the clip that acts as a sleeve for an alignment pin for a spring, as will be described in detail below. Each clip may include a respective bolt and/or only a portion of the clips may include the bolt. In the embodiment illustrated in FIG. 3, each clip 300-308 includes a respective bolt 326 to hold a respective spring.

As noted above, the first segment 204 includes a forward interface 328 configured to engage the surface of the glider 108 and an aft interface 330 configured to engage the surface of booster engine 104 when the vehicle system 100 is in the initial assembled state. The forward interface 328 may be further configured to slide along the surface of the glider 108 during the separation of the flow deflector 106 from the glider 108. In the illustrated embodiment, the forward interface 328 includes a slidable material (e.g., flexible graphite, GRAFOIL, TEFLON, and/or the like). In one embodiment, the portion of the flow deflector 106 at the forward interface 328 is made of the slidable material. In another embodiment, a separate piece of slidable material is attached to the flow deflector 106. In the embodiment illustrated in FIG. 3, a separate piece 332 of a slidable material is attached to the first segment 204 such that when the clips 300-308 grip the glider 108, the piece 318 rests on the glider 108.

As briefly mentioned above, in addition to configuring the clips of the structure to slide off the glider 108 post kick stage, the structure can further include one or more spring configured to press on the glider 108 to press the glider 108 and the flow deflector 106 apart. The spring can be placed at any suitable location within the flow deflector 106. For instance, similar to the clip, the spring can be placed on an interior surface of the flow deflector 106.

Figure 4:
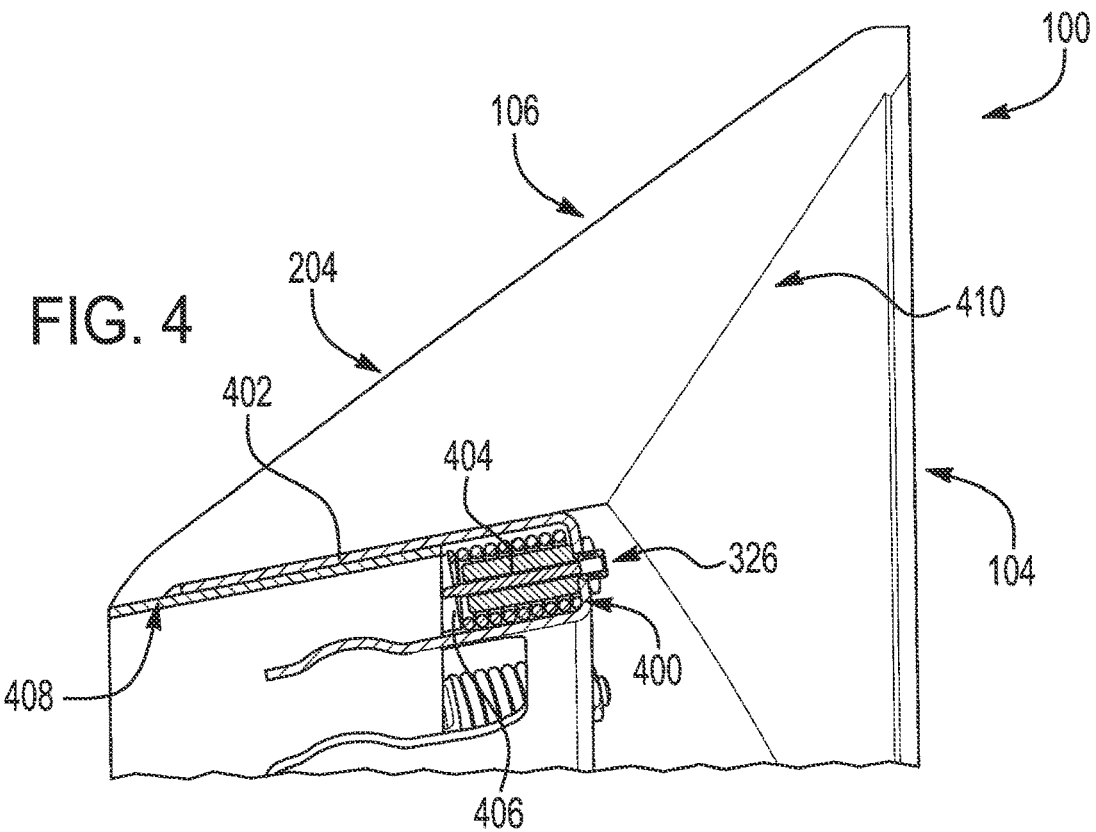
FIG. 4 is a side sectional view of the flow deflector of FIG. 1, as engaging the booster engine of FIG. 1.

In an embodiment, illustrated in FIG. 4, a spring 400 is arranged inside a clip 402 (e.g., the first clip 300 (FIG. 3)) of the first segment 204 of the flow deflector 106. In the illustrated embodiment, the spring 400 comprises a coil spring, however any suitable type of spring may be used. The first segment 204 can include any number of springs; and in the illustrated embodiment, the first segment 204 includes a spring arranged in each clip of the first segment 204. Description is now made with reference to spring 400 but can be applied to any of the other springs in the first segment 204. The flow deflector 106 includes a centering pin 404 that extends within a channel of the bolt 326 that extends through the clip 402. The centering pin 404 centers a reaction plate, described below, with respect to the clip 402.

A first end of the centering pin 404 extends in the channel of the bolt 326 and a second end of the centering pin 404 is attached to a reaction plate 406 that presses on the glider 108 when the flow deflector 106 is attached to the glider 108. The spring 400 is retained at a first end by the middle portion of the clip 402 and at an opposing end by the reaction plate 406.

The spring 400 is further provided with an initial preload, the release of which assists in the separation of the flow deflector 106 from the glider 108. Any suitable method may be used to provide the preload to the spring 400, such as compression, torsion, extension, and/or the like. In the illustrated embodiment, the spring 400 is compressed with the initial preload and the sandwiching of the flow deflector 106 between the glider 108 and the booster engine 104 holds the spring 400 in the compressed (i.e., preloaded) position. As will be described in detail below, once the booster engine 104 separates from the glider 108, the spring 400 is now free to unload the preload by expanding and pressing the flow deflector 106 away from the glider 108 by pressing the middle portion of the clip 402 away from the glider 108.

Any suitable preload may be applied to the spring 400 and the preload may depend on any number of factors. The factors can include a characteristic of the glider 108 (e.g., shape, size, weight, etc.), a characteristic of the flow deflector 106 (e.g., position of the spring, weight, shape, etc.), a characteristic of the flight (e.g., speed at the kick stage, etc.), and/or the like. Moreover, the preload may be similar for multiple springs in the flow deflector 106 and/or the preload may vary.

As mentioned above, the flow deflector 106 (FIG. 1) may include different surfaces for engaging the glider 108 (FIG. 1) and/or the booster engine 104 (FIG. 1). In the embodiment illustrated in FIG. 4, the first segment 204 includes a first surface 408 shaped to rest on and engage the glider 108 and a second surface 410 shaped to rest on and engage the booster rocket 104 when the flow deflector 106 is sandwiched between the glider 108 and booster rocket 104. The first surface 408 is at a first orientation with respect to the sloped surface 110 and the second surface 410 is at a different second orientation with respect to the sloped surface 110.

Figure 5:
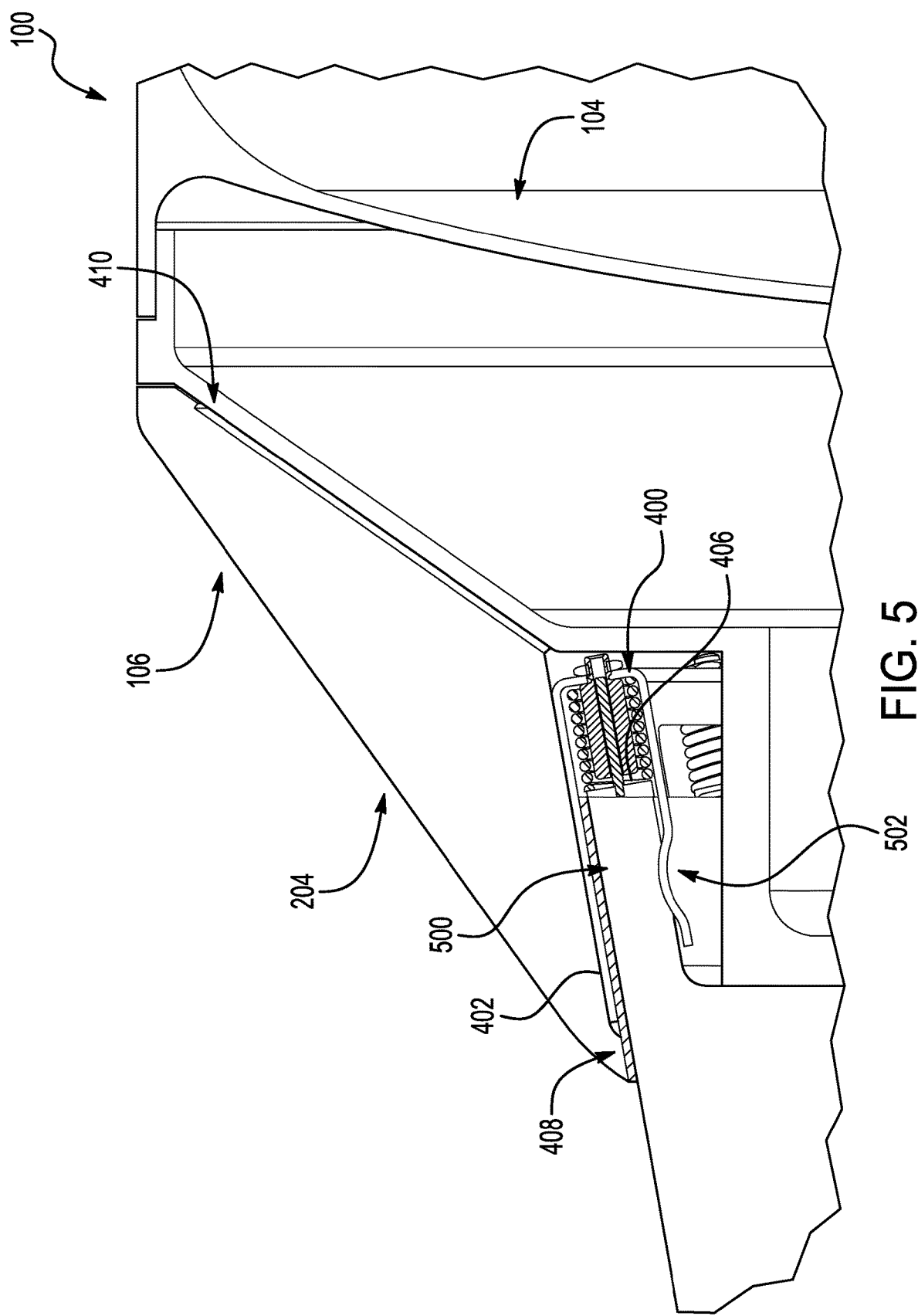
FIG. 5 is a side sectional view of the flow deflector of FIG. 1, as engaging both the booster engine and vehicle of FIG. 1.

As noted above, the attachment structure of the flow deflector 106 removably attaches to any suitable portion of the glider 108 and/or the booster engine 104. In the embodiment illustrated in FIG. 5, the clip 402 removably attaches to a flange 500 on the body of the glider 108. More particularly, the clip 402 includes another spring aspect to flexibly fit around the flange 500 such that at least an indent 502 of the clip 402 slidably engages an inner side of the flange 500. As mentioned above, and better illustrated in FIG. 5, the combination of the reaction plate 406 pressing on the flange 500, the indent 502 engaging the flange 500, and the second surface 410 engaging the booster engine 104 keeps the spring 400 in the preload position during launch and prior to the kick stage.

Figure 6:
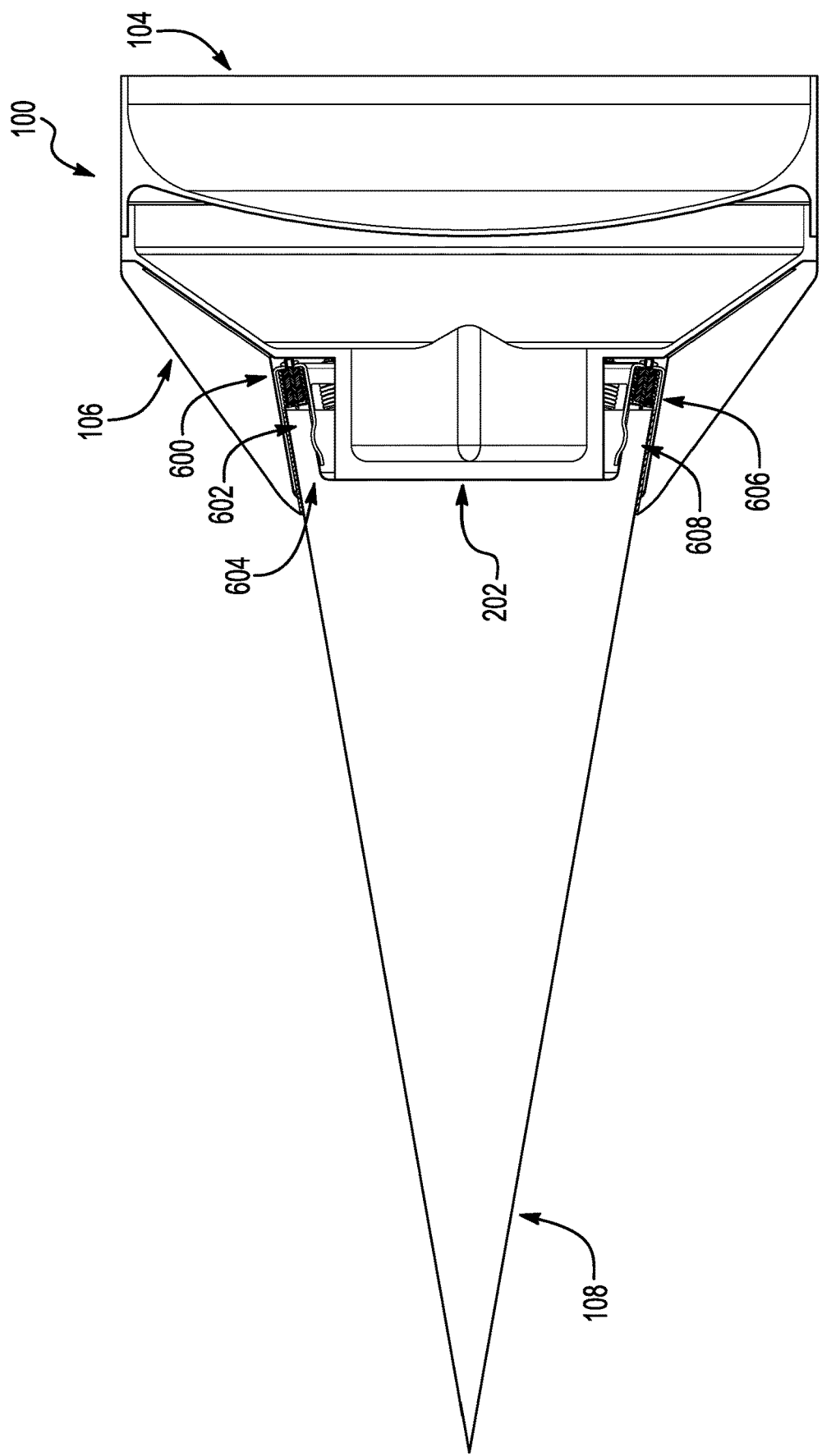
FIG. 6 is a side sectional view of the vehicle assembly of FIG. 1.

In a final assembled stage, seen in cross-section in FIG. 6, multiple clips of the flow deflector 106 (and any corresponding springs) engage different portions of the glider 108. In the illustrated embodiment, a first clip 600 engages a first portion 602 of a flange 604 of the glider 108 and a second clip 606 engages a second portion 608 of the flange 604. The first portion 602 and the second portion 608 are on opposing sides of the attachment structure 202 between the glider 108 and the booster engine 104. The use of clips on opposing sides of the glider 108 additionally limit or prevent vertical movement of the flow deflector 108 during travel of the assembled vehicle system 100.

Figure 7B:
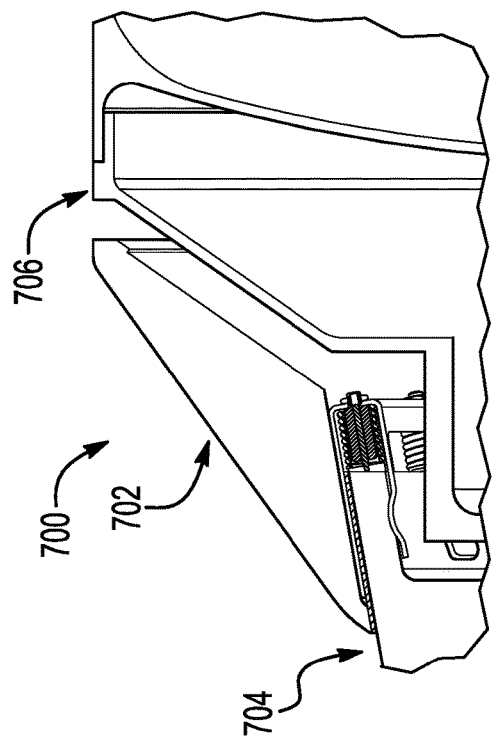
FIGS. 7A, 7B, 7C, and 7D are side sectional views of the flow deflector detaching from the vehicle body.
Figure 7D:
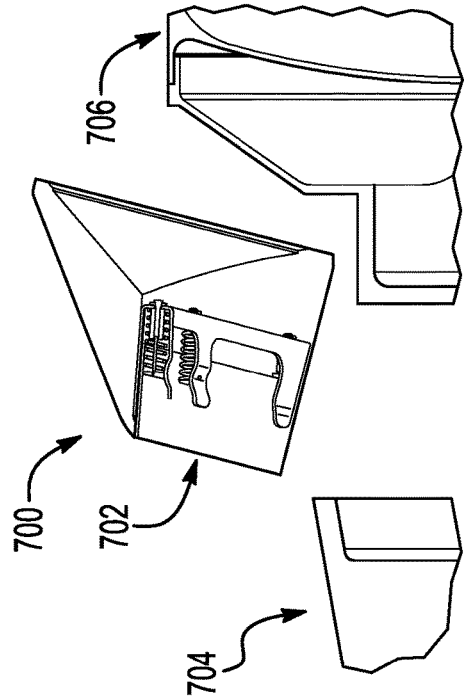
Figure 7A:
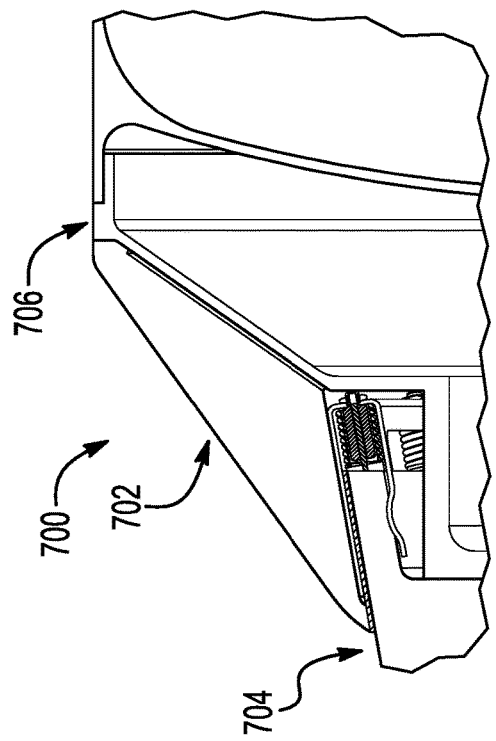

Turning now to FIGS. 7A-D, illustrated is an embodiment of the separation stages of a vehicle system 700. In FIG. 7A, a flow deflector 702 is sandwiched between a vehicle 704 (e.g., the glider 108) and a booster engine 706. A clip of the flow deflector 702 is removably attached to a flange of the vehicle 704. At a kick stage, illustrated in FIG. 7B, the vehicle 704 and the booster engine 706 are separated, i.e., the vehicle 704 is kicked from the booster engine 706.

Figure 7C:
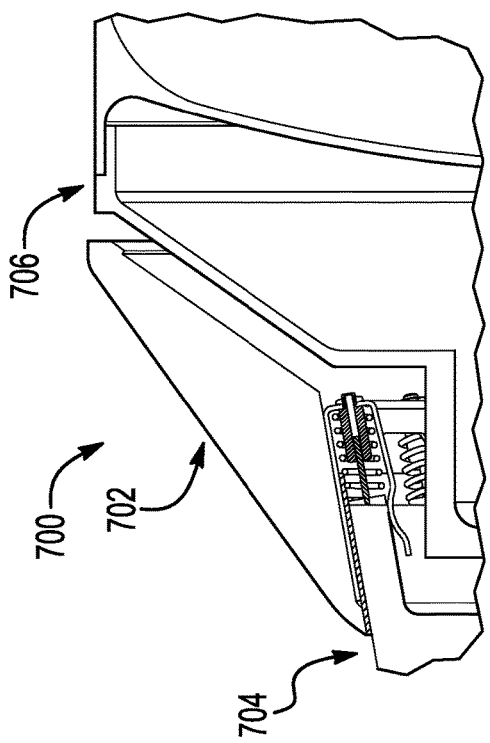

Because the clip is attached to the flange, the flow deflector 702 initially remains attached to the vehicle 704 at the kick stage. Because the spring of the flow deflector 702 is no longer restrained by the engagement of the flow deflector 702 and the booster engine 704, the spring expands. The illustrated spring is preloaded via compression and unloading the preload expands the spring pushing the flow deflector 702 away from the vehicle 704, as seen in FIG. 7C. As the spring presses the flow deflector 702 away from the vehicle 704, the clip slides along the flange of the vehicle 704. In addition to the spring causing the flow deflector 702 to separate from the vehicle 704, the flow of fluid (e.g., air) over the vehicle 704 pushes on the sloped surface of the flow deflector 702 pushing the flow deflector 702 away from the vehicle 704. As the flow deflector 108 slides off the vehicle 704, the clip will eventually disengage from the flange, at which point the flow deflector 702 will separate and fall away from the vehicle 704.

Figure 8:
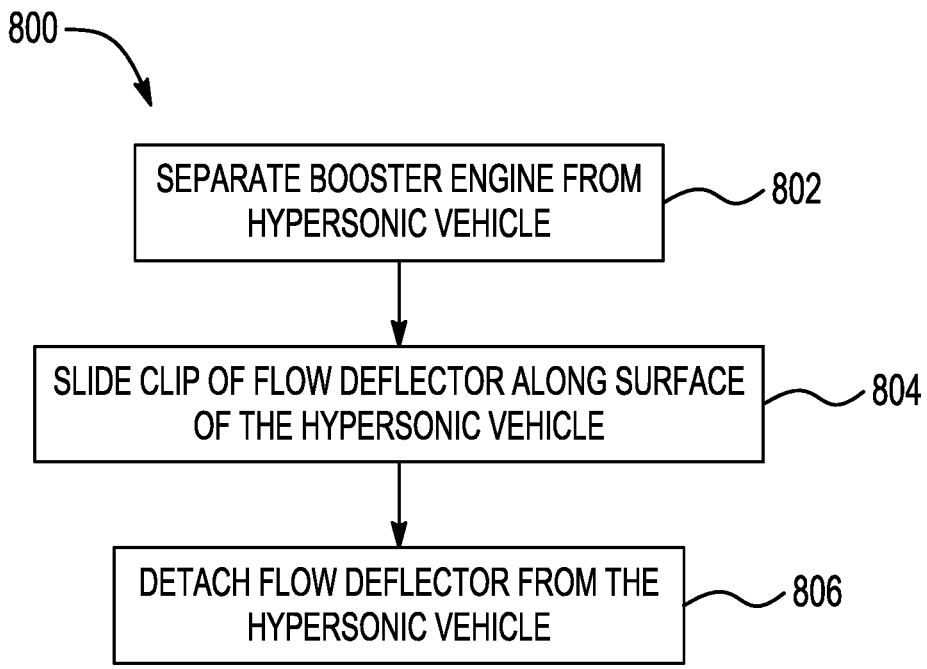
FIG. 8 is a high-level flow chart of a method according to an embodiment of the disclosure.

FIG. 8 shows a high-level flow chart of a method 800 of separating the flow deflector 106 (FIG. 1) from a hypersonic vehicle (e.g., glider 108). In step 802, the booster engine 104 (FIG. 1) is separated from the hypersonic vehicle. As described above, the hypersonic vehicle is kicked from the booster engine 104. A portion of the flow deflector 106 may be lodged between the aft end of the hypersonic vehicle and the booster engine 104 which holds the flow deflector 106 in place while the booster engine 104 is connected to the aft end of the hypersonic vehicle. The clip 302a (FIG. 3) of the flow deflector 106 is configured to fit around and engage a portion of the aft end of the hypersonic vehicle.

In step 804, after the booster engine 104 detaches from the hypersonic vehicle, the clip 302a slides along the surface at the aft end of the hypersonic vehicle. The sliding can be due to fluid flowing along the hypersonic vehicle pressing on a surface of the flow deflector. Finally, in step 806, the flow deflector 106 detaches from the hypersonic vehicle when the clip 302a slides off the surface at the aft end of the hypersonic vehicle.

Figure 9:
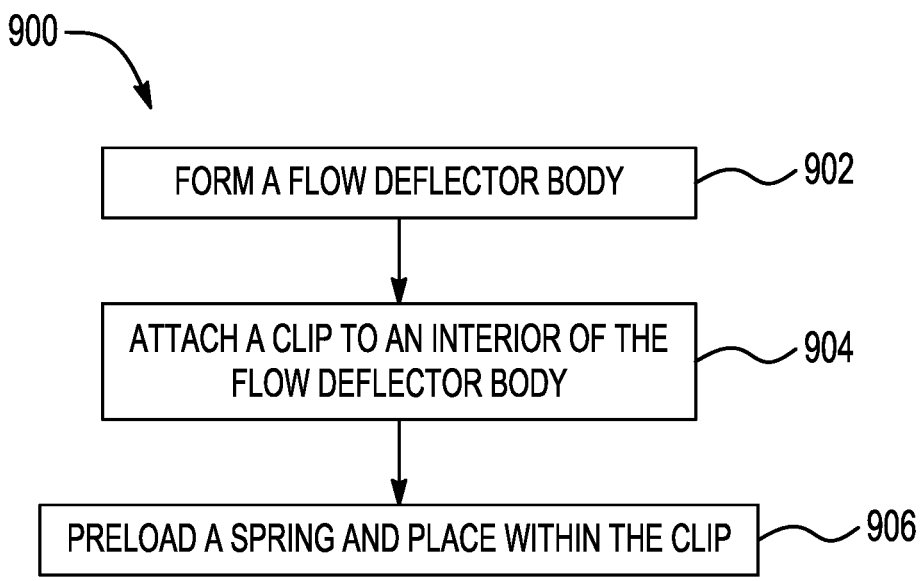
FIG. 9 is a high-level flow chart of a method according to another embodiment of the disclosure.

FIG. 9 shows a high-level flow chart of a method 900 of manufacturing the flow deflector 106. In step 902, a flow deflector body 200 (FIG. 2) is formed, for instance via injection molding. The flow deflector body 200 includes a forward end with a first portion configured to engage a surface of the hypersonic vehicle and an aft end with a second portion configured to engage a surface of a booster engine 104. In step 904, a clip 300 (FIG. 3) is attached to an interior of the flow deflector body via any suitable method, such as screws, adhesive, insertion into corresponding structure in the interior of the flow deflector, and/or the like. The clip 302a may be configured to engage a portion of an aft flange 500 (FIG. 5) of the hypersonic vehicle when the first portion engages the surface of the hypersonic vehicle. In step 906, the spring 400 (FIG. 4) is preloaded and then may be placed to engage an end of the aft flange 500 when the clip 302a engages the aft flange.

Although the disclosure shows and describes certain preferred embodiment or embodiments, it is obvious that equivalent alterations and modifications will occur to others skilled in the art upon the reading and understanding of this specification and the annexed drawings. In particular regard to the various functions performed by the above described elements (external components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A flow deflector comprising:
   a flow deflector body including a first portion at a forward end shaped to engage a surface of an aerial vehicle body and a second portion at an aft end shaped to engage a surface of a booster engine, wherein the flow deflector body comprises a plurality of body segments arranged to form the flow deflector body;
   a clip arranged in an interior of the flow deflector body, wherein the clip is configured to fit around and engage a portion of an aft flange of the aerial vehicle body; and
   a spring within the clip, wherein the spring is arranged to press on the aft flange when the clip engages the portion of the aft flange, wherein the spring is preloaded,
   wherein the spring is arranged such that a first end of the spring presses on the clip and a second end of the spring opposite the first end presses on the aft flange when the clip engages the portion of the aft flange.

2. The flow deflector of claim 1, wherein the clip is in a plurality of clips arranged on the interior of the flow deflector body, wherein each of the clips of the plurality of clips is configured to engage a different portion of the aft flange.

3. The flow deflector of claim 2, wherein a first clip of the plurality of clips is a first size, wherein a second clip of the plurality of clips is a second size different from the first size.

4. The flow deflector of claim 2, wherein the spring is in a plurality of springs, wherein each spring of the plurality of springs corresponds to a clip of the plurality of clips.

5. The flow deflector of claim 4, wherein a first spring of the plurality of springs has a first preload and a second spring of the plurality of springs has a second preload, wherein the first preload is different from the second preload.

6. The flow deflector of claim 1, wherein the flow deflector body comprises two body segments.

7. The flow deflector of claim 6, wherein a shape of each of the two body segments is similar.

8. The flow deflector of claim 1,
   wherein the flow deflector body has a hollow conical shape with an exterior surface and an interior surface, wherein the clip is arranged on the interior surface, and wherein a portion of the interior surface at the forward end engages the surface of the vehicle body and a second portion of the interior surface at the aft end engages the booster engine.

9. The flow deflector of claim 8, wherein the interior surface of the flow deflector body is shaped to surround a portion of a connection between the vehicle body and the booster engine.

10. The flow deflector of claim 1, wherein a cross-section of the forward end of the flow deflector body is different from a cross-section of the aft end of the flow deflector body.

11. The flow deflector of claim 1, wherein a cross-sectional area of the forward end of the flow deflector body is smaller than a cross-sectional area of the aft end of the flow deflector body.

12. The flow deflector of claim 1, wherein a part of the first portion that engages the surface of the vehicle body is flexible graphite.

13. The flow deflector of claim 1, wherein the flow deflector is included in a vehicle system, wherein the vehicle system further includes the aerial vehicle body and the booster engine attachable to an aft end of the aerial vehicle body.

14. A method of detaching a flow deflector from a hypersonic vehicle comprising:
- separating a booster engine from an aft end of the hypersonic vehicle, wherein a portion of the flow deflector is lodged between the aft end of the hypersonic vehicle and the booster engine holding the flow deflector in place while the booster engine is connected to the aft end of the hypersonic vehicle, wherein a clip of the flow deflector is configured to fit around and engage a portion of the aft end, wherein a spring is arranged such that a first end of the spring presses on the clip and a second end of the spring opposite the first end presses on the aft end when the clip engages the portion of the aft end;
- sliding the clip of the flow deflector along a surface of the aft end of the hypersonic vehicle due to fluid flowing along the hypersonic vehicle pressing on a surface of the flow deflector; and
- detaching a portion of the flow deflector from the hypersonic vehicle when the clip slides off the surface at the aft end.

15. The method of claim 14, wherein connection of the booster engine to the aft end holds the spring in the flow deflector in a preloaded position, wherein sliding the clip of the flow deflector along the surface is further due to unloading the preload of the spring by pressing the flow deflector away from the hypersonic vehicle.

16. The method of claim 15, wherein the preload is provided by compressing the spring.

17. The method of claim 14,
wherein a second clip of the flow deflector is configured to fit around and engage a second portion of the aft end, the method further comprising:
- sliding the second clip of the flow deflector along the surface of the aft end of the hypersonic vehicle due to fluid flowing along the hypersonic vehicle pressing on a surface of the flow deflector; and
- detaching a second portion of the flow deflector from the hypersonic vehicle when the second clip slides off the surface at the aft end.

18. The method of claim 17, wherein the flow deflector comprises a plurality of segments, wherein the portion is a first segment of the plurality of segments and the second portion is a second segment of the plurality of segments.

19. A vehicle system comprising:
- a hypersonic vehicle;
- a booster engine attachable to an aft end of the hypersonic vehicle; and
- a flow deflector removably retained between the hypersonic aerial vehicle and the booster engine, wherein the flow deflector includes:
  - a flow deflector body including a first portion at a forward end shaped to engage a surface of the hypersonic vehicle and a second portion at an aft end shaped to engage a surface of the booster engine;
  - a clip arranged in an interior of the flow deflector body, wherein the clip is configured to fit around and engage a portion of an aft flange of the aerial vehicle body, wherein the first portion engages the surface of the hypersonic vehicle and the second portion engages the booster engine to hold the flow deflector in place when the clip engages the portion of the aft flange and the booster engine is attached to the aft end of the hypersonic vehicle; and
  - a spring within the clip, wherein the spring is arranged to press on the aft flange when the clip engages the portion of the aft flange, wherein the spring is preloaded,
  wherein the spring is arranged such that a first end of the spring presses on the clip and a second end of the spring opposite the first end presses on the aft flange when the clip engages the portion of the aft flange.

20. The vehicle system of claim 19, wherein the flow deflector body comprises a plurality of body segments arranged to form the flow deflector body.

* * * * *

UNITED STATES PATENT AND TRADEMARK OFFICE
CERTIFICATE OF CORRECTION

| | | |
|---|---|---|
| PATENT NO. | : 11,987,354 B2 | Page 1 of 1 |
| APPLICATION NO. | : 17/739633 | |
| DATED | : May 21, 2024 | |
| INVENTOR(S) | : Elkins et al. | |

It is certified that error appears in the above-identified patent and that said Letters Patent is hereby corrected as shown below:

On the Title Page

In Column 2, item (56) under "Other Publications", Line 2, after "Application No.", insert --PCT/US2023/015716,--

In the Specification

In Column 5, Line 43, delete "108" and insert --106-- therefor

In Column 5, Line 44, delete "108" and insert --106-- therefor

In Column 6, Line 25, delete "108" and insert --106-- therefor

In Column 8, Line 58, delete "108" and insert --106-- therefor

In Column 9, Line 5, delete "704," and insert --706,-- therefor

In Column 9, Line 15, delete "108" and insert --106-- therefor

Signed and Sealed this
Twenty-first Day of January, 2025

Coke Morgan Stewart
*Acting Director of the United States Patent and Trademark Office*